Figure 1:
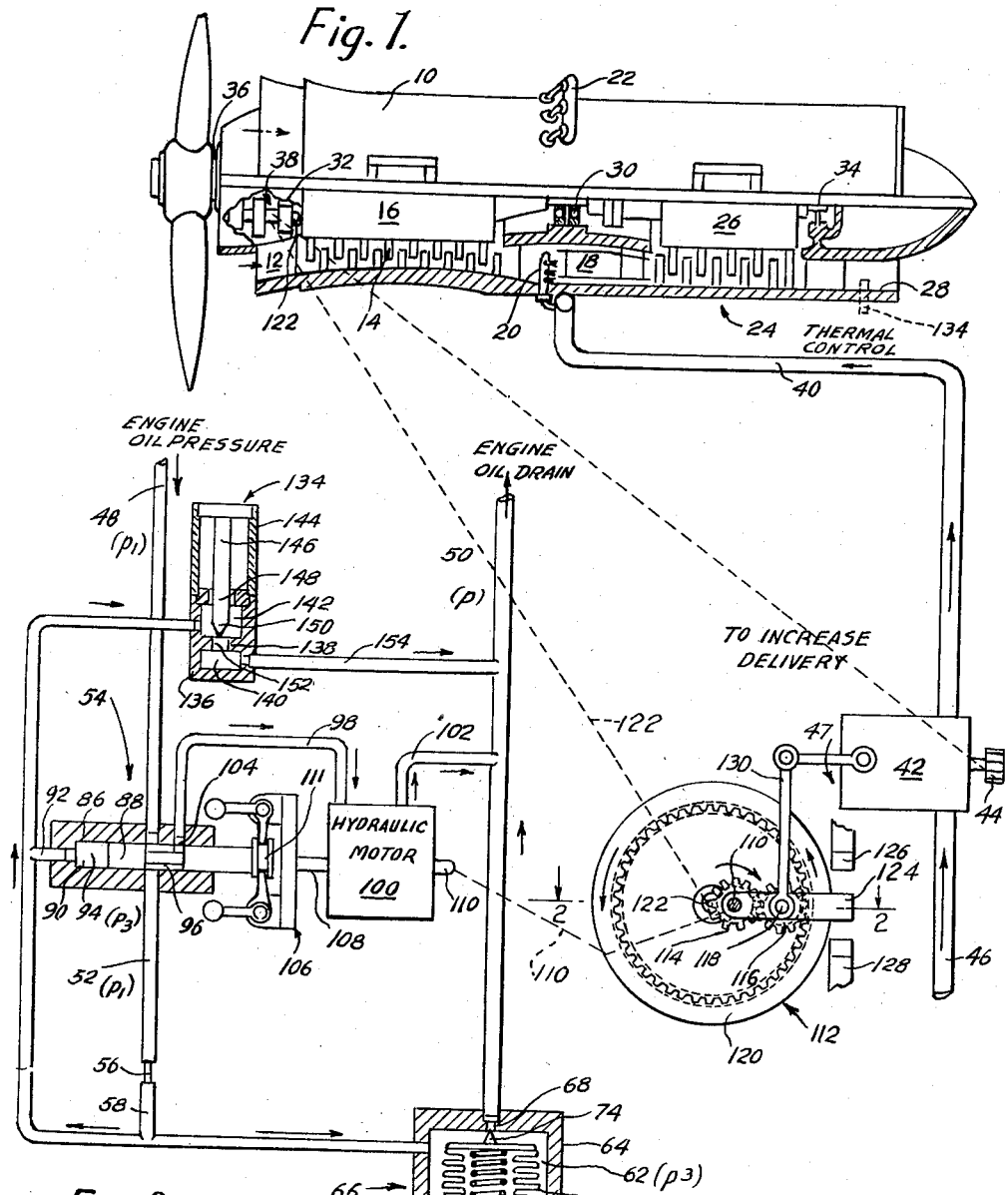

April 12, 1960 L. LEE II 2,932,165
SPEED CONTROL APPARATUS FOR ROTATABLE MECHANISM
Original Filed Jan. 10, 1947

INVENTOR
LEIGHTON LEE II.
BY
ATTORNEY

# United States Patent Office 2,932,165
Patented Apr. 12, 1960

2,932,165

SPEED CONTROL APPARATUS FOR ROTATABLE MECHANISM

Leighton Lee II, Rocky Hill, Conn., assignor, by mesne assignments, to Chandler-Evans Corporation, West Hartford, Conn., a corporation of Delaware Application October 29, 1952, Serial No. 318,279

10 Claims. (Cl. 60—39.28)

The present invention applies to fuel and speed control apparatus for prime movers, and particularly for internal combustion engines, inclusive of gas turbines and combination gas-turbine-and-jet engines; and this application is a division of my copending application for Control Apparatus for Internal Combustion Engine, Serial No. 721,269, filed January 10, 1947, now Patent No. 2,669,093.

The particular embodiments of the invention shown and described herein are intended for control of fuel delivered to an internal combustion engine suitable for jet-propulsion, or combined propeller-and-jet propulsion of air craft. Such an engine usually includes a compressor, one or more combustion chambers, a turbine, and a tail pipe, in the stated order of arrangement. Associated with the engine is a fuel pump for delivering fuel to the combustion chambers and, connected to the compressor shaft, there is a gear train for driving a propeller shaft and certain accessories.

The normal range of engine speed varies from a minimum value, which approximates 8,000 r.p.m. in the particular engine described herein, to a corresponding maximum or full-speed value approximating 13,000 r.p.m. The engine is accelerated by external starting means to the minimum speed, at which self-operation occurs and the external means ceases to function.

Both speed and temperature control are critically important in operation of an internal combustion engine such as described, principally owing to structural and metallurgical limitations of design. Moreover, the engine speed is of primary concern to the operator, since performance of aircraft in flight is predicted on the basis of several factors of which engine speed is one of the more important.

It is therefore desirable to provide fuel and speed control apparatus which enables the operator to regulate the engine speed as desired by suitably regulating the rate of fuel supply to the engine, and to render such apparatus incapable of delivering more fuel than is required to produce limited selected values of speed and temperature above which sustained operation is unsafe.

In a turbojet engine propelling an aircraft, the fuel flow required to produce a given value of engine speed varies as a function of altitude, speed of flight, combustion temperature, quality of fuel, and other factors. There is, therefore, no generally predictable relationship between engine speed and fuel flow which enables the operator to predetermine the engine speed by predetermining the fuel flow.

This invention provides improved fuel and speed control apparatus for a turbojet engine whereby the engine speed is maintained in predetermined relationship with a pre-established motor speed.

This invention also provides, in apparatus of the type described, improved means for varying the fuel flow to thereby maintain a selected value of engine speed predetermined by a corresponding selected position of a single control lever.

This invention further provides improved fuel and speed control apparatus for a turbojet engine wherein a manually operated lever is positioned according to operating conditions in said engine to produce a selected value of speed.

Another object of the present invention is to provide, in such apparatus, means for controlling the fuel flow to prevent speed and temperature values in excess of predetermined limits.

A further object of my invention is to provide fuel and speed control apparatus of improved simple design which tends to minimize hunting of the engine.

Figure 2:
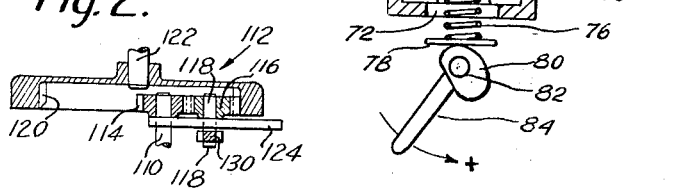

Other objects and advantages of the present invention will become apparent from a consideration of the appended specification, claims and drawing, in which:

Figure 1 illustrtates, somewhat diagrammatically, fuel control apparatus embodying principles of my invention and the relationship of such apparatus with an internal combustion engine and associated means which include a fuel pump, and Figure 2 is a horizontal cross-sectional view on the line 2—2 of Figure 1.

Referring to the drawing, Figure 1, there are shown the principal elements of an internal combustion engine suitable for propeller-propulsion or propeller-and-jet propulsion of aircraft, as follows: a supporting casing 10, an air inlet 12, a multi-stage compressor rotor indicated as 14, a compressor rotor shaft 16, a combustion chamber 18, a number of fuel discharge nozzles one of which is designated 20, a generally circular manifold 22, a multi-stage turbine indicated as 24, a turbine rotor shaft 26 connected to the compressor rotor shaft 16, a tail pipe 28 for discharge of combustion gases from turbine 24, a center bearing 30 and end bearings 32 and 34 supported by casing 10, a shaft 36, and a gear train 38 connecting shaft 36 to shaft 16.

The fuel manifold 22 in the engine is connected by a conduit 40 to a variable delivery fuel pump 42. Pump 42 is driven by the engine thru a gear 44 and is connected to a source of fuel by a fuel inlet conduit 46. The delivery of pump 42 is variable in response to movement of a lever 47 which is controlled by the fuel and speed control apparatus, the principal elements of which are identified in the immediately following brief account of its operation.

In the embodiment shown in the drawing, the speed of an hydraulic motor is maintained at a value proportional to the desired engine speed, the motor speed being controlled by regulating the flow of oil from the engine to the motor along a path including the following elements, in the stated order: an oil supply conduit 48 connected to the engine at a source of oil at a high pressure $(p_1)$, a valve sleeve 86 in a valve mechanism 54, a valve 88, a port 104, a conduit 98, the motor 100, a conduit 102, and a drain conduit 50 connected to the engine at a source of oil at a relatively low pressure $(p)$. The position of valve 88 controls the flow of motor oil along the path above defined and is determined by a pressure $(p_3)$ in a chamber 94 at the left end of valve 88, the substantially constant value of pressure $(p_3)$ being predetermined by the position of a lever 84 in a pressure regulator 66. The pressure in chamber 94 tends to move valve 88 to the right in opposition to a force produced by a speed responsive device 106 operated by motor 100, the force produced by said device having a value predetermined by the motor speed and being substantially constant when the motor speed and the pressure in chamber 94 are constant, whereby there is a substantially constant value of the motor speed corresponding to the position of lever 84. A control mechanism 112, connected to the engine and to motor 100, detects any difference between the actual engine speed and the desired engine speed as measured by the motor speed, and responds to occurrence of such a difference by moving lever 47 to vary the fuel flow in a sense to restore the actual engine speed to the desired value. The apparatus includes a thermal control 134 which automatically prevents excessive engine temperatures by reducing the speed of motor 100 whenever a predetermined value of temperature is exceeded. Excessive engine speed is also prevented by limiting the travel of lever 84 and hence the value of the motor speed.

Again referring to the drawing, in detail, oil supply conduit 48 is shown connected across valve mechanism 54 to a conduit 52, the pressure in which is $(p_1)$ as in conduit 48. Conduits 48 and 52 may be directly connected to each other, if desired.

Another passage for the flow of oil from the engine is provided thru conduit 48, across mechanism 54, and thru conduit 52, a restriction 56 at the lower end of conduit 52, a conduit 58 and another conduit 60 connected thereto, a generally cylindrical chamber 62 in a body 64 of the pressure regulator 66, and a valve seat 68 in the closed end of body 64 approximately on the centerline of chamber 62, to drain conduit 50 at pressure $(p)$.

A bellows 70 has one end fixed in chamber 62 to the lower end of body 64 in which there is an aperture 72. On the other end of bellows 70 is a valve 74 operable to vary the effective area of flow thru valve seat 68 in the upper end of body 64. A spring 76, in compression inside bellows 70 between the free end of the bellows and a support 78, tends to move valve 74 upward toward seat 68 with a force which depends on its initial length and on its rate and deflection. A cam 80, mounted on a shaft 82 is operable by the manually controlled lever 84 to vary the deflection and hence the force of spring 76.

In operation of the pressure regulator 66, fluid enters chamber 62 thru conduit 60 and subjects bellows 70 to the differential between the fluid pressure $(p_3)$ in chamber 62 and the atmospheric pressure $(p_A)$ inside the bellows. The differential $(p_3-p_A)$, or the gage pressure $(p_3)$, produces a force proportional to the area of the bellows 70 in opposition to the force of spring 76. Since the position of valve 74 in steady state operation is determined by a condition of balance between forces acting on bellows 70, it follows that, when the position of support 78 is constant, the valve seeks a position at which sufficient flow is allowed to occur from chamber 62 to conduit 50 to reduce the value of the pressure $(p_3)$ so that the upward force of spring 76 balances the downward force due to the pressure $(p_3)$ acting on bellows 70. The pressure $(p_3)$ is thus maintained substantially constant at a value predetermined by the deflection of spring 76 and hence by the position of lever 84.

The restriction 56 limits the area of flow from conduit 52 so that, as flow past valve 74 increases, the pressure $(p_3)$ downstream from restriction 56 decreases. The respective areas of restriction 56 and valve seat 68 are such that the regulator 66 operates within acceptable limits of travel of valve 74 and regulates the pressure $(p_3)$ within a desired range and with a desirable degree of accuracy.

In valve mechanism 54, valve 88 is slidable in a cylindrical bore 90 inside sleeve 86, the left-hand end of which is closed and connected to conduit 60 by a conduit 92. The pressure $(p_3)$ is thus transmitted from conduit 60, thru conduit 92, to chamber 94 at the left-hand end of valve 88. Valve 88 is provided with an annular undercut 96 which permits flow of fluid from conduit 48, past undercut 96, and thence into conduit 52 and also into conduit 98 and thence thru motor 100 to drain conduit 50. The volume of oil entering motor 100 and hence the motor speed is a function of the effective area of flow of port 104 to which conduit 98 is connected. The valve 88 is operable to vary the effective area of flow thru port 104 in response to the speed responsive device 106 which is operated by a shaft 108 at the speed of motor 100. If desired, the speed responsive device 106 may be operated at any suitable proportional value of the motor speed.

Device 106 is connected to valve 88 at a groove 111 provided at the right end of the valve, and moves valve 88 leftward in opposition to the pressure $(p_3)$ in chamber 94, as the speed increases. For any given substantially constant value of the pressure $(p_3)$, therefore, there is a corresponding substantially constant value of motor speed which produces equilibrium of forces acting on valve 88, and hence positions valve 88 to control the flow thru port 104 and the motor. Assuming substantially constant characteristics of performance of motor 100 and a substantially constant value of the pressure $(p)$ in conduit 102, it is apparent that the speed of motor 100 is predetermined by the value of the pressure $(p_3)$ in chamber 94 and conduits 92 and 60.

The lever 84 is operated in reference to a calibrated quadrant, not shown, which enables the operator to visually select the correct lever position corresponding to the value of the pressure $(p_3)$ and hence to the respective desired values of the motor and engine speeds.

The condition of equilibrium of forces acting on valve 88, and therefore its position, may be disturbed by increase or decrease of either the motor speed or the value of pressure $(p_3)$. Assuming valve 88 in a position of equilibrium, the response to motor speed changes may be explained as follows:

(1) When the motor speed tends to exceed the predetermined value, valve 88 moves leftward, the effective area of flow thru port 104 is decreased, the motor speed therefore is decreased, and equilibrium is restored at the predetermined motor speed corresponding to the value of pressure $(p_3)$.

(2) Similarly, when the speed of motor 100 tends to drop below the predetermined value, valve 88 is moved toward the extreme position shown in the drawing, at which the effective area of flow thru port 104 is maximum. Before or approximately upon reaching such a position, however, the flow thru port 104 will have been sufficiently increased to increase the speed of motor 100 and hence restore the speed to the desired predetermined value.

(3) When the pressure $(p_3)$ is changed by movement of the lever 84, a temporary condition follows during which valve 88 seeks a new position of equilibrium and the speed of motor 100 changes to another substantially constant predetermined lesser or greater value, depending on whether the pressure $(p_3)$ is decreased or increased. Counterclockwise movement of lever 84 from the position shown increases the motor speed.

Motor 100 is connected by a shaft 110 to control mechanism 112 which includes a sun gear 114 mounted on and driven by shaft 110 which rotates in a clockwise direction. Gear 114 engages a similar planet gear 116 mounted on a stub shaft 118, gear 116 being engaged with a ring gear 120 mounted on a shaft 122 and operated by the engine at a speed proportional to engine speed, in a counterclockwise direction. Both shaft 122 and shaft 110 have fixed centerlines. With a slight increase in the respective diameters of gears 114 and 116, the centerline of shaft 110 may be made to coincide with that of shaft 122 according to conventional practice in differential gearing; separation of the shaft centerlines, as shown, is permitted as a result of the relatively small movement of a lever 124, which holds gears 114 and 116 in proper relationship with each other and in which shaft 118 is fixed. Lever 124 is hinged to shaft 110.

The relative sizes of gears 120 and 114 are selected so that when the actual engine speed, indicated by the speed of counterclockwise rotation of gear 120, is equal to the desired engine speed, indicated by the speed of clockwise rotation of gear 114, the tooth velocities of gears 114 and 120 are equal. The ratio of the desired engine speed to the motor speed, or to the speed of rotation of gear 114, therefore differs from the ratio of the actual engine speed to the speed of rotation of gear 120 according to the ratio of the respective numbers of teeth in gears 114 and 120. In a condition in which the actual engine speed equals the desired engine speed, or in which the tooth velocities of gears 114 and 120 are equal, the centerline of shaft 118 and hence lever 124 remains stationary, while gear 116 rotates on shaft 118.

Among other possible arrangements of gears which are alternate to the arrangement shown, there is included an assembly of three bevel gears having an identical number of teeth in each. In such an assembly, the ratio between the motor speed and the speed of rotation of a bevel gear corresponding to gear 114 is identical with the ratio between the actual engine speed and the speed of rotation of a bevel gear corresponding to gear 120.

When the actual engine speed exceeds a desired value, or when the tooth velocity of gear 120 exceeds that of gear 114, gear 116 and shaft 118 are caused to move in a counterclockwise direction relative to the center of shaft 110, thereby moving lever 124 towards stop 126. A link 130 connects shaft 118 to lever 47 so that as lever 124 moves toward stop 126, lever 47 moves clockwise to decrease the delivery of pump 42. The engine speed is consequently reduced until the desired value is restored, lever 124 then occupying a new position between stops 126 and 128 depending upon the amount of movement of lever 47 required to accomplish the fuel delivery decrease.

Similarly, when the actual engine speed is less than a desired value, or when the tooth velocity of gear 120 is less than that of gear 114, gear 116 and shaft 118 are caused to move in a clockwise direction relative to the center of shaft 110, thereby moving lever 124 towards stop 128. Lever 47 is correspondingly moved counterclockwise to increase the delivery of pump 42. The engine speed is consequently increased until the desired value is restored, lever 124 then occupying a new position between stops 126 and 128 depending upon the amount of movement of lever 47 required to accomplish the fuel delivery decrease.

At maximum and minimum pump delivery settings determined by extreme positions of lever 47, lever 124 just clears stops 128 and 126, respectively, and the fuel pump delivery varying means is correspondingly positioned for maximum and minimum delivery.

When the actual engine speed deviates from the desired value predetermined by the speed of motor 100, so that the tooth velocity of gear 120 differs from that of gear 114 to such an extent that lever 124 moves against stop 126 or 128, the engine is then direct-connected to the motor thru gears 120, 116 and 114. If lever 124 is against stop 126, as is the case when the engine speed is greater than desired, motor 100 is driven by the engine at a speed greater than that corresponding to the position of lever 84. This condition imposes no hardship on the motor or other elements of the apparatus, however, and is temporary.

With lever 124 against stop 126, the fuel pump delivery has a minimum value which quickly reduces the engine speed and permits restoration of the desired speed at which lever 124 is moved off stop 126. Similarly, if lever 124 is against stop 128, as is the case when the engine speed is less than desired, the engine temporarily decreases the motor speed. In this case, however, with lever against stop 128, the fuel pump delivery has a maximum value which quickly increases the engine speed, thereby restoring the desired speed at which lever 124 is moved off stop 128.

Thermal control 134 is provided to protect the engine against the possibility of excessive operating temperatures, control 134 being effective to reduce the pressure ($p_3$) and hence the motor speed when a predetermined value of temperature is exceeded. Thus, following such reduction of motor speed, there is a corresponding reduction of engine speed produced by fuel flow decrease which restores the engine temperature to safe operating values.

Thermal control 134 comprises a body 136 having a wall 138 separating an outlet chamber 140 from an inlet chamber 142. Inlet chamber 142 is connected to conduit 60 and outlet chamber 140 is connected to drain conduit 50 by a conduit 154. One end of a thin-walled tube 144 is fixed to the closed end of body 136 nearest inlet chamber 142, and has attached to its other end, which is closed, a rod 146 which is slidable in a centrally located aperture 148 in the end of body 136 to which tube 144 is fixed. The free end of rod 146 is contoured to form a valve 150, which is operable in a seat 152 in wall 138. Tube 144 and rod 146 are made from materials having substantially different coefficients of thermal expansion and the unit is installed in the engine, as shown diagrammatically, with tube 144 exposed to the temperature of combustion gases in the tail pipe 28 of the engine, or at any other desired control point. As the temperature increases, the tube 144 expands faster than the rod 146, thereby increasing the effective area of opening between valve 150 and seat 152. Generally, control 134 is made so that the valve remains closed until a limiting value of temperature is exceeded.

When valve 150 is closed, as is normally true, no flow occurs in thermal control 134 and the pressure ($p_3$) is a function solely of movement of lever 84.

When valve 150 is open, however, as is the case when the predetermined value of limiting temperature is exceeded, flow occurs thru conduit 60, chamber 142, past valve 150, thru chamber 140, and thence thru conduit 154 to drain conduit 50. As valve 150 opens to permit such flow, the pressure ($p_3$) in conduit 60 decreases owing to increased flow thru restriction 56. The speed of motor 100 consequently decreases, the fuel flow decreases to provide a corresponding engine speed decrease and the engine temperature is thereby reduced. Valve 150 is restored to closed position and the pressure ($p_3$) is restored to its normal value when the engine temperature equals or falls below the predetermined limiting value. Normal operation of the apparatus is then reestablished.

Protection of the engine from over-speeding is provided by limiting the travel of lever 84. There is thus a maximum value of the pressure ($p_3$) and hence maximum predetermined values of the motor and the engine speeds.

In steady state operation, engine speed deviations from the desired value determined by the speed of motor 100 generally occur slowly and are of small magnitude. The response of gear 120 to changes in engine speed is immediate and, similarly, the response of lever 124 and hence of the delivery varying means to such variations in engine speed is also immediate. Time lag, therefore, between demand for a change of fuel flow and the occurrence of such change is of sufficiently small proportions to prevent hunting. Upon rapid movement of control lever 84, the consequent change of motor speed is not equally rapid owing to inertia of the motor and to the time required for change of the rate of flow thru valve 88. The delivery varying means, however, immediately responds to changes in the motor speed so that hunting in this case is also prevented.

The terms and expressions herein are employed for purposes of description and not of limitation, and I have no intention, in the case of such terms and expressions, of excluding any equivalents of the features shown and described or portions theerof, but recognize that various modifications are possible within the scope of the invention claims.

I claim as my invention:

1. Fuel and speed control apparatus for an internal combustion engine having a pump for supplying fuel thereto, said pump having means for varying the delivery thereof to control the speed of said engine, comprising: first means rotatable at a selected substantially constant speed, second means for selecting the value of said speed of said first means, third means responsive to the relative speeds of said first means and of said engine; said third means being adapted, when the ratio between the respective values of said relative speeds deviates from a predetermined value, to operate said delivery varying means in a sense to eliminate said deviation and thereby restore said speed ratio to said predetermined value; and a thermal control for overriding said second means to decrease the speed of said first means, and hence to decrease said fuel flow and said engine speed, when the temperature of said engine exceeds a predetermined value; whereby the engine speed is a function of the operation of said second means and of said thermal control.

2. In combination with an aircraft turbojet engine whose speed is controlled by controlling only the rate of fuel supply thereto a pump for supplying fuel to said engine, said pump having means for varying the delivery thereof to control the speed of said engine throughout its speed range, and a fuel and speed control apparatus comprising: a source of hydraulic fluid and conduit means for the flow of fluid therefrom, an hydraulic motor responsive to said flow, governor means for regulating said flow to maintain the speed of said motor at a selected substantially constant value; and differential means responsive to the respective speeds of said motor and said engine for controlling said delivery varying means; said differential means being adapted to regulate said fuel delivery, and hence said engine speed, to maintain said engine speed in predetermined relationship with said motor speed; whereby said engine has a substantially constant speed determined by the selected speed of said motor and said predetermined relationship.

3. Fuel and speed control apparatus for an internal combustion engine having a pump for supplying fuel thereto, said pump having means for varying the delivery thereof to control the speed of said engine, comprising: a source of hydraulic fluid and conduit means for the flow of fluid therefrom, an hydraulic motor responsive to said flow, governor means for regulating said flow to maintain the speed of said motor at a selected substantially constant value, manually operated means for selecting said value, differential means responsive to the respective speeds of said motor and said engine for controlling said delivery varying means; said differential means being adapted to regulate said fuel delivery, and hence said engine speed, to maintain said engine speed in predetermined relationship with said motor speed; and temperature responsive means for overriding said manually operated means to reduce said motor speed, and hence said fuel delivery and said engine speed, when a predetermined value of engine temperature is exceeded; whereby said engine speed is a function of the operation of said manually operated means and said temperature responsive means.

4. Fuel and speed control apparatus for an internal combustion engine having a pump for supplying fuel thereto, said pump having means for varying the delivery thereof to control the speed of said engine, comprising: an hydraulic motor and a source of fluid connected thereto for operation thereof as a function of the flow of said fluid therethru, a device responsive to the speed of said motor, valve means responsive to said device for controlling said fluid flow to maintain a substantially constant value of said motor speed; and differential means responsive to the relative speeds of said motor and said engine for controlling said fuel delivery varying means and hence said engine speed, said differential means being adapted to maintain said engine speed in a substantially constant relationship with said motor speed.

5. Fuel and speed control apparatus for an internal combustion engine having a pump for supplying fuel thereto, said pump having means for varying the delivery thereof to control the speed of said engine, comprising: an hydraulic motor and a source of fluid connected thereto for operation thereof as a function of the flow of said fluid therethru, a device responsive to the speed of said motor, valve means responsive to said device for controlling said fluid flow, control means for varying the response of said valve means to said device; said valve means being adapted to increase or to reduce said fluid flow, thereby increasing or decreasing said motor speed, when said motor speed is respectively less than or greater than a value predetermined by said control means, whereby said motor speed has a substantially constant predetermined value; differential gear means including a first gear operated at a speed proportional to said motor speed, a second gear operated at a speed proportional to said engine speed, and a third gear operated by said first and second gears; said third gear being responsive to the relative tooth velocities of said first and second gears and adapted to control said fuel delivery varying means, and hence said engine speed, to maintain the respective values of said relative velocities equal to each other, whereby the engine speed has a substantially constant value that is a function of the operation of said control means.

6. Fuel and speed control apparatus for an internal combustion engine having a pump for supplying fuel thereto, said pump having means for varying the delivery thereof to control the speed of said engine, comprising: an hydraulic motor and a source of fluid connected thereto for operation thereof as a function of the flow of said fluid therethru, a device responsive to the speed of said motor, valve means including a valve for controlling said fluid flow, regulating means for maintaining a substantially constant fluid pressure on said valve, said valve being responsive to said device in opposition to said fluid pressure and being adapted to maintain said motor speed in a predetermined constant relationship with the value of said pressure, thereby rendering said motor speed substantially constant; differential means responsive to the relative speeds of said motor and said engine for controlling said fuel delivery varying means and hence said engine speed; said differential means being adapted, when and as said relative speeds differ within pre-established limits from a preselected ratio, to change said fuel delivery an amount corresponding to the magnitude of said difference and in a sense to restore said ratio; said differential means being also adapted when the difference between said relative speeds exceeds pre-established limits, to change said fuel delivery in a sense to eliminate said difference and to override said valve means to provide operation of said motor by said engine until said difference does not exceed said pre-established limits; whereby the engine speed is substantially constant.

7. Fuel and speed control apparatus for an internal combustion engine having a pump for supplying fuel thereto, said pump having means for varying the delivery thereof to control the speed of said engine, comprising: a source of hydraulic fluid at superatmospheric pressure, a conduit for the flow of fluid from said source, a valve in said conduit for controlling said fluid flow therethru, a motor responsive to said fluid flow, first and second means responsive to the speed of said motor and operable thereby at respective speeds proportional to said motor speed, said first means being connected to said valve for operation thereof in a flow-decreasing sense when said motor speed exceeds a predetermined value, and in a flow-increasing sense when said motor speed falls below said predetermined value, said motor speed thereby having a substantially constant predetermined value; third means responsive to the engine speed, and fourth means responsive to said second and said third means for controlling said fuel delivery varying means, said fourth means being adapted when the ratio between the respective speeds of said second and third means deviates from a preselected value to operate said delivery varying means in a sense to compensate said deviation, said engine speed being varied as said delivery is varied to restore said ratio to said preselected value and said value of said ratio thereby being maintained substantially constant, whereby the engine speed has a substantially constant value proportional to the value of said motor speed.

8. Fuel and speed control apparatus for an internal combustion engine having a pump for supplying fuel thereto, said pump having means for varying the delivery thereof to control the speed of said engine, comprising: a source of hydraulic fluid at superatmospheric pressure, a conduit for the flow of fluid from said source, a valve in said conduit for controlling said fluid flow therethru, a motor responsive to said fluid flow, first and second means responsive to the speed of said motor and operable thereby at respective speeds proportional to said motor speed, said first means being connected to said valve for operation thereof in a flow-decreasing sense when said motor speed exceeds a predetermined value, and in a flow-increasing sense when said motor speed falls below said predetermined value, said motor speed thereby having a substantially constant predetermined value; third means responsive to the engine speed, fourth means responsive to said second and said third means for controlling said delivery varying means, said fourth means being adapted when the ratio between the respective speeds of said second and third means deviates from a preselected value to operate said delivery varying means in a sense to compensate said deviation, said engine speed being varied as said delivery is varied to restore said ratio to said preselected value and said value of said ratio thereby being maintained substantially constant, fifth means for predetermining the value of said motor speed, and sixth means for overriding said fifth means to reduce said motor speed and hence said fuel delivery and said engine speed when a pre-established value of engine temperature is exceeded, whereby the engine speed varies as a function of the operation of said fifth and said sixth means.

9. Fuel and speed control apparatus for an internal combustion engine having a pump for supplying fuel thereto, said pump having means for varying the delivery thereof to control the speed of said engine, comprising: a source of hydraulic fluid at superatmospheric pressure, a conduit for the flow of fluid from said source, a valve for controlling said flow in said conduit, manually controlled means for subjecting said valve to a substantially constant fluid pressure of predetermined value, a motor responsive to said flow in said conduit; said valve being responsive to said predetermined pressure and to the speed of said motor and being adapted to operate in a flow-decreasing sense, when said motor speed exceeds a value determined by said predetermined value of said pressure, and being also adapted to operate in a flow-increasing sense, when said motor speed falls below said predetermined value, said motor speed thereby having a substantially constant value predetermined by said manually controlled means; first means responsive to said motor speed and rotatable thereby at a speed proportional to said motor speed, second means responsive to said engine speed and rotatable thereby at a speed proportional to said engine speed; third means responsive to the relative speeds of rotation of said first and said second means and adapted, when the speed of said second means exceeds the speed of said first means, to operate said delivery varying means in a sense to decrease said delivery and hence said engine speed; said third means being also adapted, when the speed of said second means is less than the speed of said first means, to operate said delivery varying means in a sense to increase said delivery and hence said engine speed; whence there is a substantially constant relationship between the respective speeds of said first and second means, whereby said engine speed has a substantially constant value predetermined by the operation of said manually controlled means.

10. Control apparatus for an internal combustion engine having a pump for delivering fuel thereto, said pump having means for varying its delivery, comprising a fluid-actuated control valve operatively associated with said delivery-varying means and connected to a device having means to generate a force corresponding to the actual speed of the engine, a manually operated control lever adapted to apply a control fluid pressure to position said valve corresponding to a selected desired engine speed, means for generating and transmitting from said valve to said device a second force corresponding to said selected desired engine speed, and means responsive to the imbalance of said first and second forces for actuating said fuel delivery-varying means, whereby the fuel delivery of said pump is so controlled as to cause the actual speed of the engine to correspond to the selected desired speed.

References Cited in the file of this patent

UNITED STATES PATENTS

| | | |
|---|---|---|
| 2,053,682 | Schaer | Sept. 8, 1936 |
| 2,269,332 | Bench et al. | Jan. 6, 1942 |
| 2,403,371 | Ifield et al. | July 2, 1946 |
| 2,604,756 | Greenland | July 29, 1952 |
| 2,622,393 | Edwards et al. | Dec. 23, 1952 |
| 2,632,996 | Rood | Mar. 31, 1953 |